United States Patent
Semba et al.

(10) Patent No.: US 7,268,968 B2
(45) Date of Patent: Sep. 11, 2007

(54) VIBRATION SUPPRESSION FOR SERVO CONTROL

(75) Inventors: Tetsuo Semba, San Jose, CA (US); Matthew White, Mountain View, CA (US); Eric Baugh, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 10/956,972

(22) Filed: Sep. 30, 2004

(65) Prior Publication Data

US 2006/0072392 A1   Apr. 6, 2006

(51) Int. Cl.
 *G11B 5/596*  (2006.01)
 *G11B 21/02* (2006.01)
(52) U.S. Cl. .............. 360/77.02; 360/77.06; 360/78.04
(58) Field of Classification Search .......... 369/103, 369/47.37; *G11B 7/00, 27/24*
 See application file for complete search history.

(56) References Cited

U.S. PATENT DOCUMENTS

| | | | |
|---|---|---|---|
| 6,377,418 B1 | 4/2002 | Kagami et al. | |
| 6,487,028 B1 | 11/2002 | Sri-Jayantha et al. | |
| 6,532,129 B1 * | 3/2003 | Sri-Jayantha et al. | 360/77.02 |
| 6,594,106 B1 | 7/2003 | Serrano et al. | |
| 2002/0034036 A1 | 3/2002 | Sri-Jayantha et al. | |
| 2003/0067708 A1 | 4/2003 | Ozawa | |
| 2004/0004782 A1 | 1/2004 | Masashi | |
| 2004/0090698 A1 | 5/2004 | Dang et al. | |

* cited by examiner

*Primary Examiner*—Andrea Wellington
*Assistant Examiner*—Jason Olson
(74) *Attorney, Agent, or Firm*—Townsend and Townsend and Crew LLP; Patrick Duncan

(57) ABSTRACT

Embodiments of the present invention provide a way to modify the controller of a HDD head actuator to increase the error rejection capability and suppress the wideband vibration that affects the head motion. In one embodiment, a system to suppress influence of an external disturbance to an actuator comprises a controller providing a controller output as an actuator input to drive an actuator; a feedback loop to feed a head signal at an output of the actuator back as an input to the controller to produce an error signal; and a plurality of peak filters coupled to the controller and having different peak frequencies. Each peak filter has a peak filter input including the error signal, and has a peak filter output. A supervisor module is coupled with the peak filters to selectively add or delete the peak filter output of each peak filter to the actuator input to drive the actuator.

26 Claims, 5 Drawing Sheets

VIBRATION SUPPRESSION FOR SERVO CONTROL

CROSS-REFERENCES TO RELATED APPLICATIONS

Not Applicable

BACKGROUND OF THE INVENTION

This invention relates generally to hard disk drive control and, more particularly, to suppressing the influence of external mechanical vibrations on a hard disk drive system.

Hard disk drives (HDDs) are used in various environments, and sometimes they suffer performance degradation due to external mechanical vibrations. In the past, when a disk drive had a low data capacity, the track pitch was larger and the mechanical vibration reflected less head motion compared to the data track pitch. Recently, however, the track pitch has become very narrow and even small vibrations can cause large off-track motions, yielding lower performance. Previously, such degradation due to external vibrations was encountered only in unusual operating environments, but today it can be observed as performance degradation under typical operating conditions. While vibration due to disk rotation has a narrow band, external mechanical vibration can have a substantially wider band. A number of techniques may be used to address the problem caused by external vibrations.

The acceleration feedforward control method utilizes the rotational vibration sensor output and feeds it forward to the actuator control signal so that the head motion counteracts the vibrations which move the head off-track. This method works effectively when the vibration is rotational, for which the gain and the phase of the transfer function from the sensor output and the position error signal is known and does not change very much. However, the head position is not only affected by the in-plane rotational vibration, but can also be affected by various kinds of linear and rotational vibrations which cannot be picked up by the rotational vibration sensors.

The chasing peak filter method uses a peak filter that changes its frequency adaptively and tracks the frequency changes of the vibration source. The peak filter works to increase the error rejection capability at a certain frequency. Because the peak filter has a narrow bandwidth, it does not work effectively for the case where the vibration has multiple peak frequencies or a wider spectrum.

A method has been used to identify the best peak filter frequency at the beginning of the drive power-on process by scanning over peak frequencies. This method only works for the case where the vibration characteristics do not change over time. Even when this method can be used for the data recovery process, the performance drawback will still be quite large since the method takes a rather long time.

The shock mount is a HDD mounting mechanism for lowering the transfer functions from the external vibration source to the actual vibration of the drive, and works effectively when the vibration frequency is higher than the resonant frequency of the mounting mechanism. The problem is that the mounting mechanism tends to increase the vibration at its own resonant frequency.

BRIEF SUMMARY OF THE INVENTION

Embodiments of the present invention provide a way to modify the controller of a HDD head actuator to increase the error rejection capability and suppress vibrations over a wide frequency range (e.g., 10-100 Hz) that affects the head motion, thereby minimizing the performance degradation caused by external vibrations. A plurality of peak filters are coupled to the servo controller of the HDD head actuator to provide a wide peak filter frequency bandwidth. The peak filters can be separately enabled or disabled on demand, and may be variable to adjust the peak filter frequency up or down on demand. In this way, the peak filters can be adapted to suppress a range of vibrations over a relatively wide frequency bandwidth.

An aspect of the present invention is directed to a system to suppress influence of an external disturbance to an actuator. The system comprises a controller providing a controller output as an actuator input to drive an actuator; a feedback loop to feed a head signal at an output of the actuator back as an input to the controller to produce an error signal; a plurality of peak filters coupled to the controller and having different peak frequencies, each peak filter having a peak filter input including the error signal, each peak filter having a peak filter output; and a supervisor module coupled with the peak filters to selectively add or delete the peak filter output of each peak filter to the actuator input to drive the actuator.

In some embodiments, the plurality of peak filters are coupled in parallel to the controller. The supervisor module is configured to delete the peak filter outputs of the peak filters to the actuator input if the error signal does not exceed a preset error signal threshold. The supervisor module is configured to delete the peak filter outputs of the peak filters to the actuator input if the largest peak filter output of the peak filters over the peak filter input does not exceed a preset ratio threshold. The supervisor module may be configured to selectively add the peak filter outputs of the peak filters to the actuator input if the peak filter output of at least one of the peak filters over the peak filter input exceeds a preset ratio threshold. The supervisor module may be configured to add the peak filter outputs of one or more of the peak filters to the actuator input if the peak filter outputs of the one or more peak filters over the peak filter input exceed the preset ratio threshold.

In specific embodiments, at least one of the peak filters has a variable peak frequency. The peak filters may all have variable peak frequencies. A frequency identification module may be provided to determine a frequency of the external disturbance, and the supervisor module is configured to adjust the variable peak frequencies of the peak filters based on the frequency of the external disturbance. The supervisor module may be configured to compare magnitudes of the peak filter outputs of the peak filters; and (i) to adjust the peak frequencies of the peak filter upward if the magnitude of the peak filter output of the peak filter having the highest peak frequency is larger than the magnitudes of the peak filter outputs of remaining peak filters; and (ii) to adjust the peak frequencies of the peak filters downward if the magnitude of the peak filter output of the peak filter having the lowest peak frequency is larger than the magnitudes of the peak filter outputs of remaining peak filters.

In accordance with another aspect of the present invention, a method of suppressing influence of an external disturbance to an actuator comprises providing a controller output of a controller as an actuator input to drive an actuator; feeding a head signal at an output of the actuator back as an input to the controller to produce an error signal; coupling a plurality of peak filters to the controller, the peak filters having different peak frequencies, each peak filter having a peak filter input including the error signal, each peak filter having a peak filter output; and selectively adding or deleting the peak filter output of each peak filter to the actuator input to drive the actuator.

In accordance with another aspect of the invention, a system to suppress influence of an external disturbance to an actuator comprises a controller providing a controller output as an actuator input to drive an actuator; a feedback loop to feed a head signal at an output of the actuator back as an input to the controller to produce an error signal; and a plurality of peak filters coupled to the controller and having different peak frequencies. Each peak filter has a peak filter input including the error signal, and a peak filter output. A supervisor module is coupled with the peak filters. The supervisor module includes a program stored in a computer-readable storage medium. The program has code for selectively adding or deleting the peak filter output of each peak filter to the actuator input to drive the actuator.

In some embodiments, the program comprises code for deleting the peak filter outputs of the peak filters to the actuator input if the error signal does not exceed a preset error signal threshold. The program may comprise code for deleting the peak filter outputs of the peak filters to the actuator input if the largest peak filter output of the peak filters over the peak filter input does not exceed a preset ratio threshold. The program may comprise code for selectively adding the peak filter outputs of the peak filters to the actuator input if the peak filter output of at least one of the peak filters over the peak filter input exceeds a preset ratio threshold. The program may comprise code for adding the peak filter outputs of one or more of the peak filters to the actuator input if the peak filter outputs of the one or more peak filters over the peak filter input exceed the preset ratio threshold. The program may comprise code for comparing magnitudes of the peak filter outputs of the peak filters and; code for adjusting the peak frequencies of the peak filter upward if the magnitude of the peak filter output of the peak filter having the highest peak frequency is larger than the magnitudes of the peak filter outputs of remaining peak filters; and code for adjusting the peak frequencies of the peak filters downward if the magnitude of the peak filter output of the peak filter having the lowest peak frequency is larger than the magnitudes of the peak filter outputs of remaining peak filters.

DETAILED DESCRIPTION OF THE INVENTION

Figure 1:
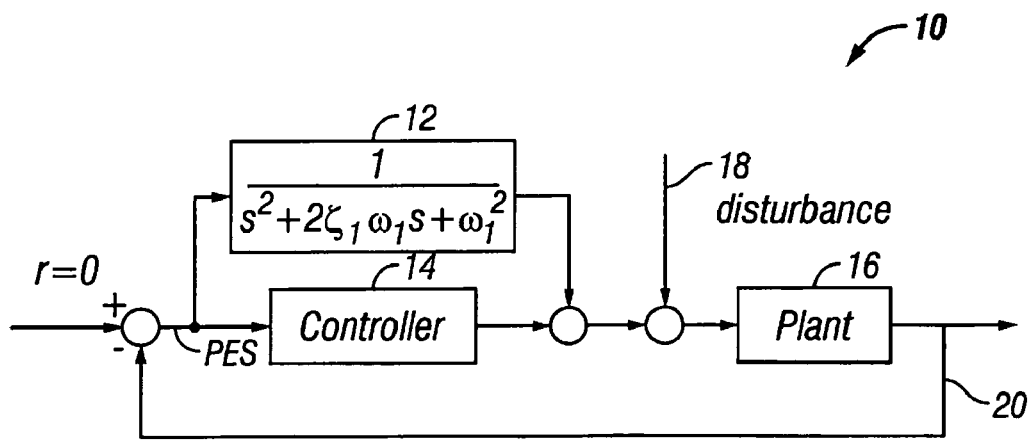
FIG. 1 is schematic diagram showing a conventional peak filter in a servo control loop.

FIG. 1 shows a conventional peak filter in a servo control loop 10. The peak filter 12 is connected in parallel to the servo controller 14 for driving a plant 16 such as a HDD head actuator. The peak filter 12 is, for example, a second order filter that modifies the open loop transfer function and the sensitivity function (or error rejection function) of the control loop to provide a higher rejection at a particular frequency associated with the disturbance 18. The head position signal at the output of the plant 16 is fed back via the feedback loop 20 to be subtracted from the input to the controller 14 as the position error signal (PES). The PES is also an input to the peak filter 12.

Figure 2:
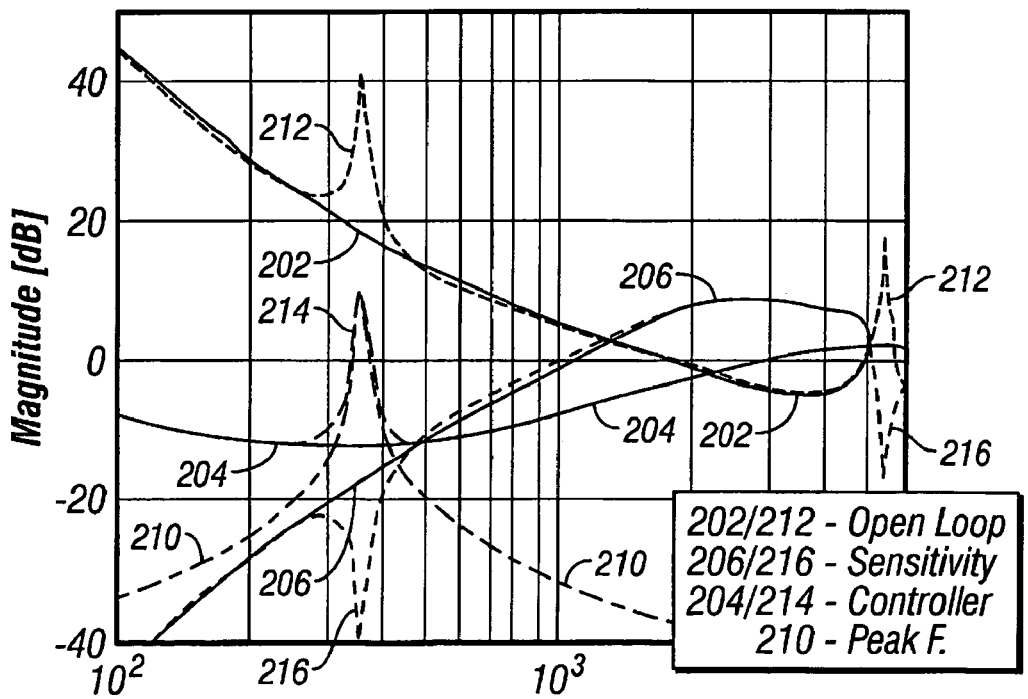
FIG. 2 is a plot showing transfer function change by the conventional peak filter of FIG. 1.

FIG. 2 shows the transfer function change by the peak filter 12 in the servo control loop 10 of FIG. 1. Without the peak filter 12, the open loop transfer function 202, controller function 204, and sensitivity or error rejection function 206 are as seen in FIG. 2. With the addition of the peak filter function 210 which peaks at about 350 Hz in this example, the open loop transfer function 212, controller function 214, and sensitivity function 216 each also include a positive/negative peak at that peak frequency. The sensitivity function or error rejection function 216 dips at the peak frequency, representing an improved error rejection at the peak frequency. The error rejection is the ratio of the PES and the disturbance 18. The higher the disturbance 18, the larger the magnitude of the dip of the sensitivity function 216 is required in order to keep the PES within an acceptable level and ideally at zero. The use of the peak filter as shown in FIG. 1 is widely used to suppress repeatable runouts which are very narrowband disturbances.

Because externally induced vibrations are generally wideband, the conventional narrowband peak filter cannot adequately suppress the influence of such vibrations. It may be possible to use a single wideband peak filter having a sufficient bandwidth, for instance, by increasing the gain or magnitude of the peak frequency. Such a peak filter, however, can produce too much distortions of the sensitivity function at other frequencies and undesirable transient response of the peak filter output.

Figure 3:
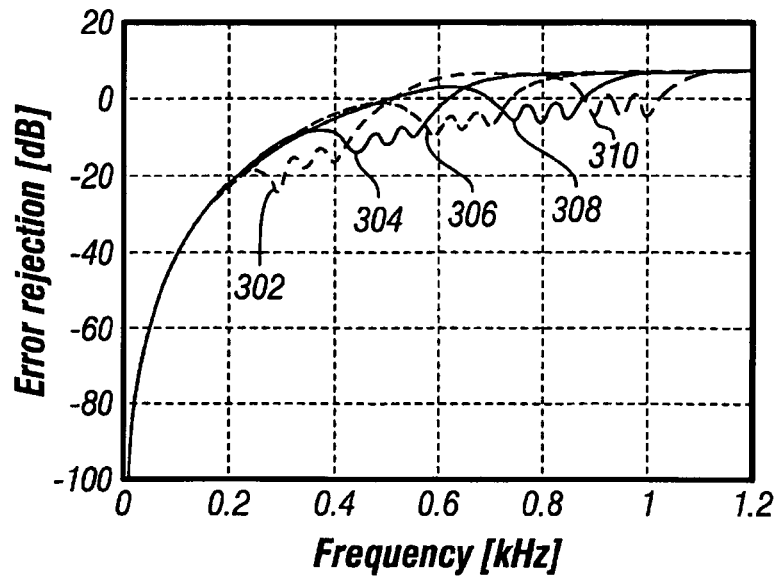
FIG. 3 is a plot showing sensitivity function improvement by multiple peak filters.

The inventors have found that the use of multiple peak filters can reduce distortions and transient effects. FIG. 3 shows the sensitivity function or error rejection function for three peak filters coupled in parallel with the servo controller. The three peak filters have peak frequencies that are spaced apart by 50 Hz intervals. For instance, the first sensitivity function 302 dips at three peak frequencies of 300 Hz, 350 Hz, and 400 Hz. FIG. 3 shows shifting of the peak frequencies upward for other sensitivity functions, including sensitivity functions 304 (450 Hz, 500 Hz, 550 Hz), 306 (600 Hz, 650 Hz, 700 Hz), 308 (750 Hz, 800 Hz, 850 Hz), and 310 (900 Hz, 950 Hz, 1000 Hz). The use of multiple peak filters instead of one peak filter allows one to widen the effective peak filter frequency bandwidth while simultaneously using peak filters of a lower gain to achieve a given error rejection due to the accumulative effects of the multiple peak filters. As compared to the sensitivity function 216 of the single peak filter in FIG. 2, the sensitivity functions of multiple peak filters shown in FIG. 3 have more desirable characteristics. By lowering the gain of the peak filters, the distortions of the sensitivity function at other frequencies are reduced or minimized; by widening the peak filter frequency bandwidth, the undesirable transient response of the peak filter output is also reduced or minimized.

Figure 4:
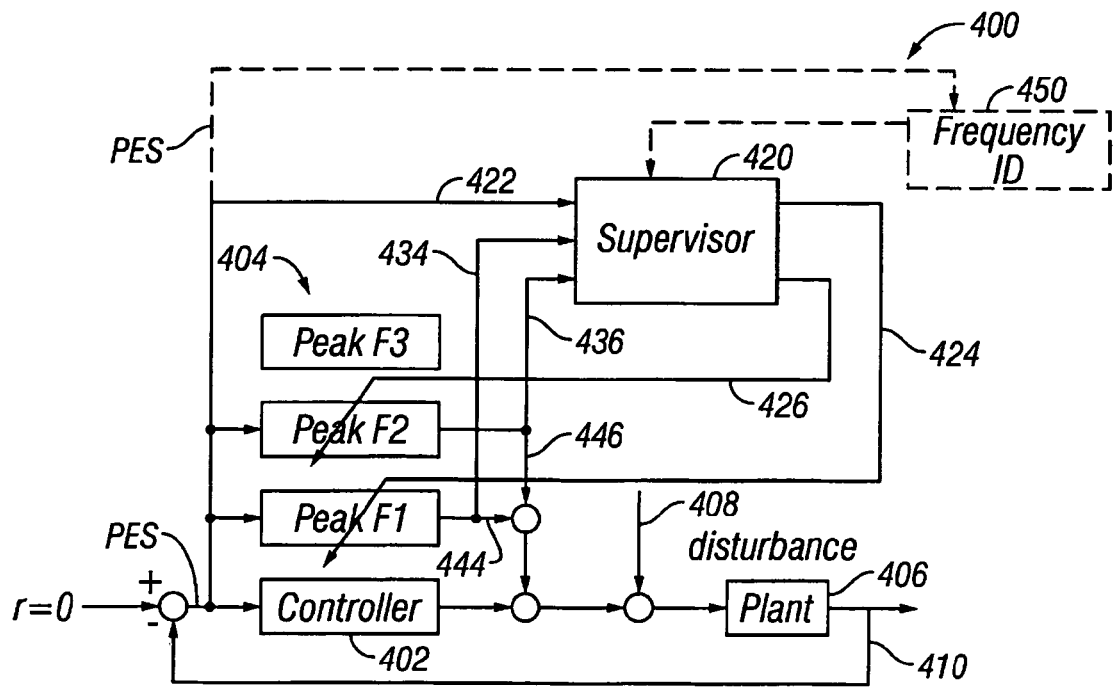
FIG. 4 is a schematic diagram showing a plurality of peak filters in a servo control loop according to an embodiment of the present invention.

FIG. 4 shows a control system 400 illustrating a servo control loop for a controller 402 having connected thereto a plurality of peak filters 404. FIG. 4 shows peak filters 404 with peak frequencies of F1 and F2 coupled in parallel with the controller 402. The peak filters 404 will be preferably low damping if the distortions of the sensitivity function at other frequencies need to be reduced. They will be preferably wideband filters if the number of peak filters need to be reduced. The peak filter 404 with a frequency of F3 may also be connected if necessary, and is meant to illustrate that additional peak filters may be added to the system. The peak frequency F2 is greater than the peak frequency F1 (the peak frequency F3 may be greater than the peak frequency F2). As discussed in more detail below, the peak frequencies F1, F2, F3 may be fixed or variable. In addition, alternative embodiments may couple the peak filters to the controller in series or in parallel and in series. The servo controller 402 is used to drive a plant 406 such as a HDD head actuator. The peak filters 404 modify the open loop transfer function and the sensitivity function (or error rejection function) of the control loop to provide higher rejections at particular frequencies associated with the disturbance 408. The head position signal at the output of the plant 406 is fed back via the feedback loop 410 to be subtracted from the input to the controller 402 as the position error signal (PES). The PES is also an input to the peak filters 404. In other embodiments, the feedback signal may be a head velocity signal or some other head signal, which produces an error signal that can be a velocity error signal or the like.

A supervisor module 420 is provided to manage the peak filters 404. In general, the peak filters 404 can be turned on at all times. Because the peak filters 404 will degrade the error rejection at other frequencies, however, it is desirable to be able to enable or disable each peak filter 404 on demand. When a peak filter is enabled, the peak filter output of that peak filter is added to the drive signal in the servo control loop to drive the plant 406; when the peak filter is disabled, the peak filter output of that peak filter is not added to the drive signal in the servo control loop. The first criterion is that the peak filters 404 will need to be enabled only if the magnitude of the PES exceeds a certain PES threshold that is acceptable under normal operating conditions. This can be expressed as:

$|PES| > threshold_{PES}.$

The PES threshold as derived from an electrical signal may be expressed as a voltage or the like which is convertible to a distance that indicates error in the HDD head motion (e.g., 1 μm or as low as 0.1 μm or less). The supervisor 420 receives the PES via input line 422, and can make a determination based on a comparison with the PES threshold and subsequently enable or disable the first peak filter at frequency F1 and second peak filter at frequency F2 via control lines 424, 426, respectively. When the magnitude of the PES exceeds the threshold, there is a possibility of an excess amount of external vibration. In that case, one or more of the peak filters 404 may be enabled to suppress the error caused by the vibration.

When the peak filters 404 are enabled, because the peak filter input is fed by the PES (as fed back via the feedback loop 410), the system 400 will know whether the peak filters 404 work effectively or not by comparing the input and output signals of the peak filters 404. When a peak filter works effectively to suppress error, the peak filter output is larger than, typically substantially larger than, the peak filter input because of the frequency match. When a peak filter does not work effectively, the peak filter output is approximately equal to or smaller than the peak filter input because either there is a frequency mismatch or the PES is simply smaller. This is the second criterion, which is that the peak filter will be enabled if the magnitude of the ratio between the peak filter output and the peak filter input exceeds a certain threshold of the ratio or ratio threshold. This may be expressed as:

$|(peak\ filter\ output/peak\ filter\ input)| > threshold_{ratio}.$

The ratio threshold may be typically about 2-4 times, and can be to 10 times or higher. Thus, the peak filters 404 will be enabled by adding the peak filter outputs to the servo control loop to drive the plant 406 if both criteria above are satisfied.

The peak filter outputs are directed to the supervisor 420 from the first peak filter at frequency F1 and second peak filter at frequency F2 via peak filter output lines 434, 436, respectively. When multiple peak filters are used, the largest peak filter output is compared with the peak filter input to determine whether to enable the peak filters (if the peak filter output over the peak filter input ratio exceeds a preset ratio threshold) or disable the peak filters (if the peak filter output over the peak filter input ratio does not exceed the preset ratio threshold). When the peak filters 404 are enabled by the supervisor 420, the peak filter outputs are added to the servo control loop via k filter output paths 444, 446 to drive the plant 406. The peak filter outputs may be selectively added to the plant control signal to drive the plant 406 depending on the output of each individual peak filter as compared to the peak filter input. When the peak filters 404 are disabled by the supervisor 420, no peak filter outputs are provided to the servo control loop.

Another feature of the peak filters 404 is that their frequencies can be made variable and are adjusted based on the PES or other signals in the servo control loop. The frequency of the peak filters 404 is adjusted up or down to match the frequency of the disturbance 408 in order to effectively suppress the error caused by the disturbance 408. The frequency of the disturbance 408 may be determined by any suitable methods. One way is to use a conventional frequency identification method (frequency ID block 450 in FIG. 4) such as FFT (Fast Fourier Transform) or highpass/lowpass/bandpass filtering on the PES to identify the frequency and provide that information to the supervisor 420, which in turn adjusts the peak filters 404 to match the peak frequency with the identified frequency.

Another method is an adaptive frequency change method that is believed to be less complicated and more effective than the conventional frequency identification method for adjusting the peak filter frequency. This method involves comparing the magnitudes of the peak filter outputs of different peak frequencies (e.g., F1, F2, and F3). When the output of the peak filter which has the highest resonant frequency (e.g., F3) is larger in magnitude than the outputs of the other peak filters, it implies that the vibration frequency is equal to or higher than the highest resonant frequency of that peak filter. Therefore, a better error rejection can be obtained by moving the peak filter frequency of the peak filters higher. On the other hand, when the output of the peak filter which has the lowest resonant frequency (e.g., F1) is larger in magnitude than the outputs of the other peak filters, it implies that the vibration frequency is equal to or lower than the lowest resonant frequency of that peak filter. Accordingly, a better error rejection can be obtained by moving the peak filter frequency of the peak filters lower.

An example of three peak filters is used to illustrate the adaptive frequency change method. Of course, the methodology works for two peak filters or more than three peak filters. It is assumed that the peak frequency F2 of the second filter is higher than the peak frequency F1 of the first filter, and that the peak frequency F3 of the third filter is higher than the peak frequency F2 of the second filter. When the vibration frequency is lower than or equal to the peak frequency F1 of the first filter, the output of the first peak filter is larger in magnitude than the outputs of the other two filters. Therefore, one should shift the peak frequencies of the peak filters down to achieve the maximum error rejection effect. When the vibration frequency is higher than or equal to the peak frequency F3 of the third filter, the output of the third peak filter is larger in magnitude than the outputs of the other two filters. In that case, one should shift the peak frequencies of the peak filters up to achieve better error rejection. The amount of frequency shift upward or downward can be estimated initially based on the available data, and then further adjusted in subsequent steps until the peak frequencies settle within a range of relatively small variations.

Figure 5:
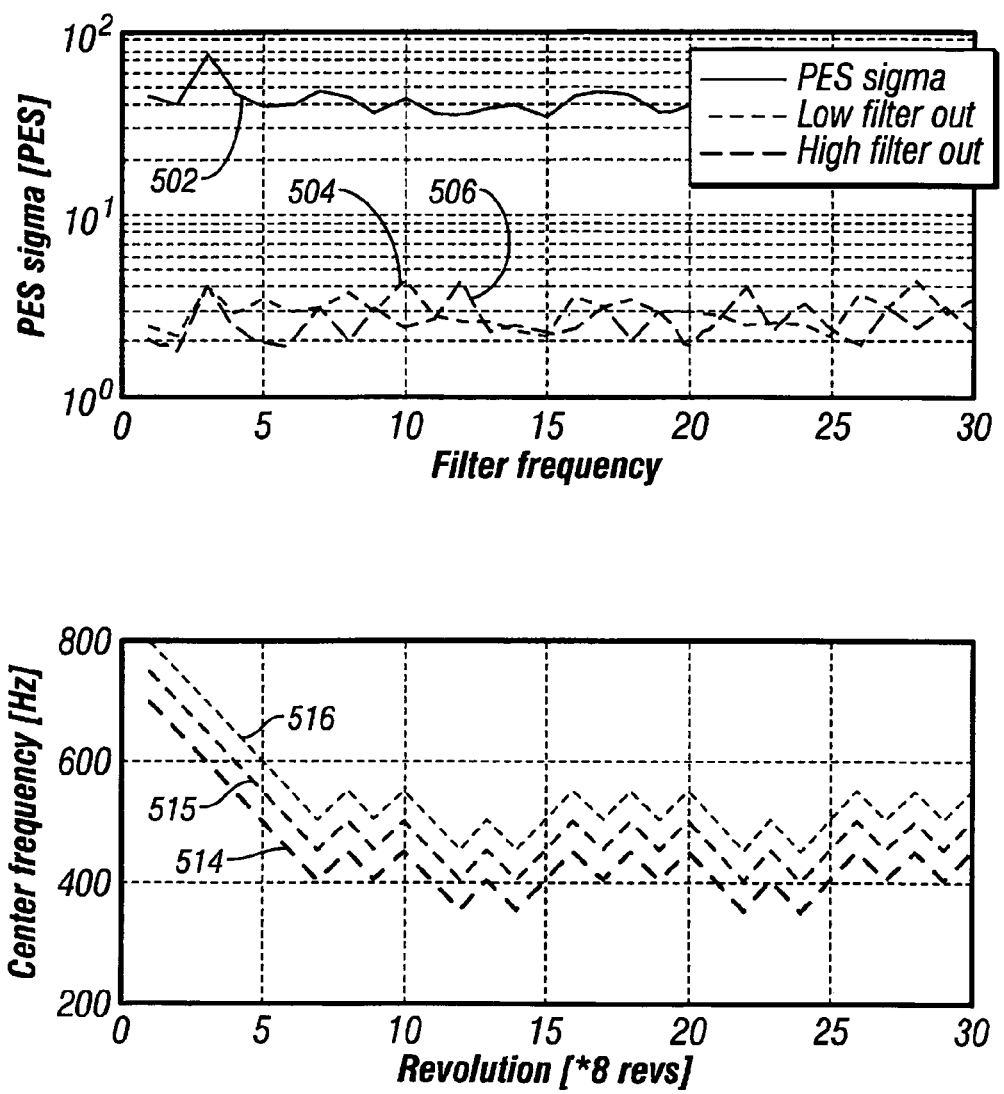
FIG. 5 shows simulation results of adaptively controlling the plurality of peak filters to suppress the influence of external vibrations.

Advantageously, the adaptive frequency change method works effectively when the frequency of the vibration changes. FIG. 5 shows simulation results of an adaptive frequency change scheme used by the supervisor 420 to manage three peak filters 404 to improve error rejection caused by the disturbance 408 where the frequency of the disturbance 408 changes over time. The upper plot shows the magnitude of the standard deviation (PES sigma) of the PES 502, the output magnitude of the first filter with the lowest peak frequency F1 504, and the output magnitude of the third filter with the highest peak frequency F3 506. The lower plot shows the change of the peak frequencies for the first filter with the lowest peak frequency F1 514, the second filter with the intermediate peak frequency F2 515, and the third filter with the highest peak frequency F3 516. Initially, the first filter with the lowest peak frequency F1 504 has the largest output magnitude. In response, the supervisor 420 adjusts the peak frequencies 514, 515, 516 downward as seen in the lower plot. As the filter frequencies reach the optimum range around the bandwidth of the disturbance 408, the first filter with the lowest peak frequency F1 504 and the third filter with the highest peak frequency F3 506 take turns having the higher output magnitude, as shown in the upper plot. In response, the peak frequencies 514, 515, 516 stay with a range of relatively small variations, as seen in the lower plot.

Figure 6A:
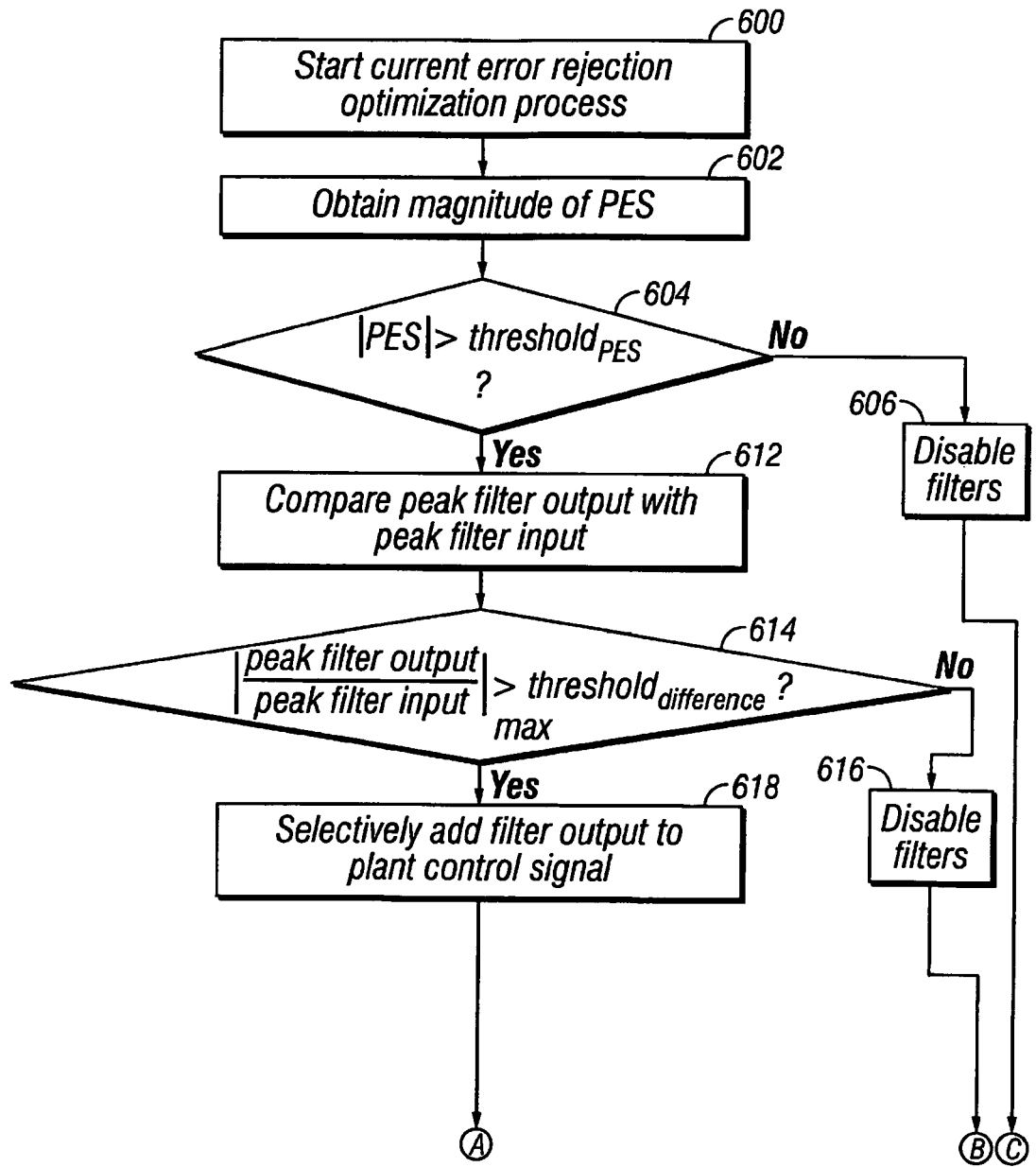
FIG. 6 is a flow diagram illustrating a method of adaptively controlling the plurality of peak filters to suppress the influence of external vibrations according to an embodiment of the present invention.
Figure 6B:
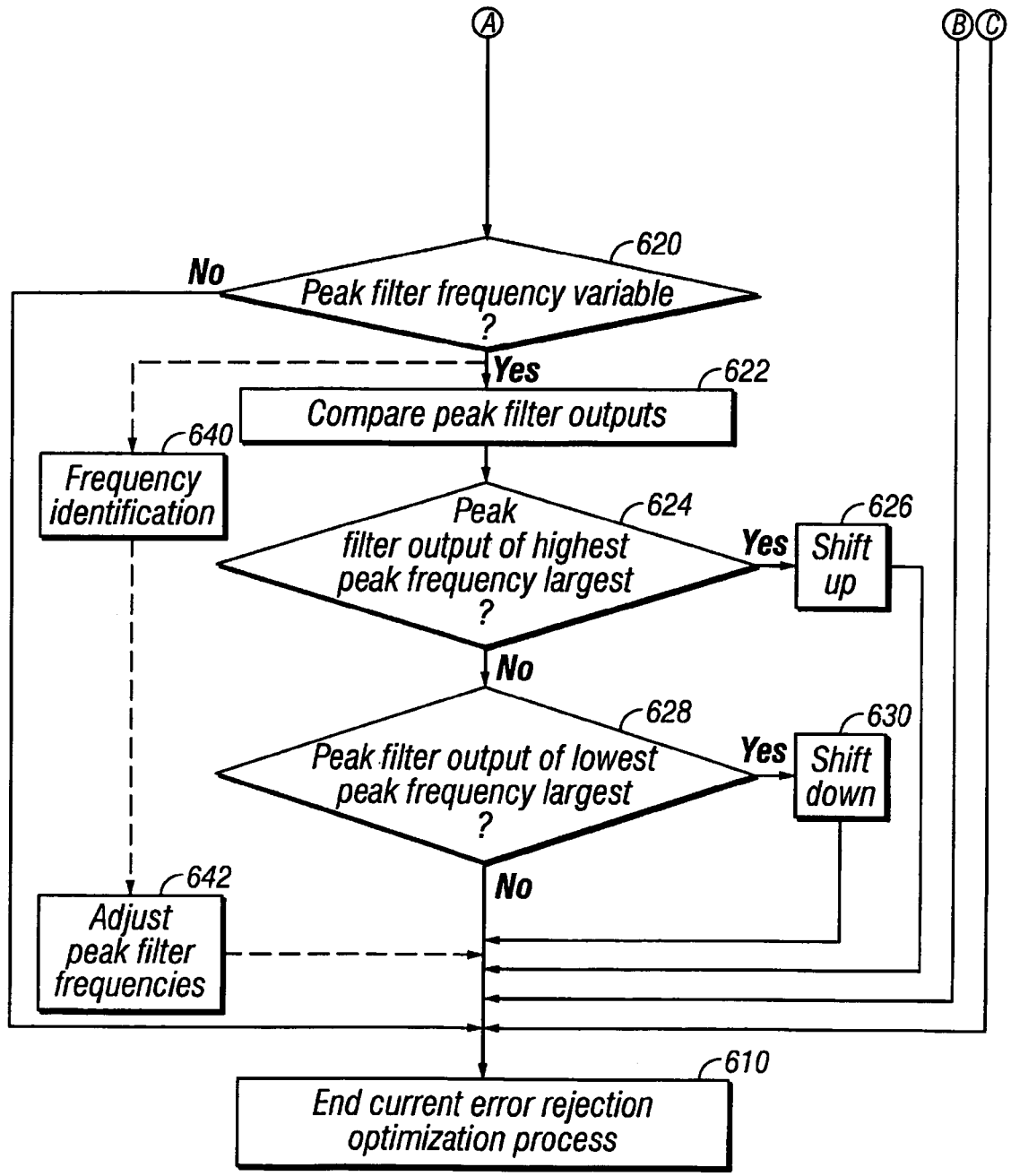

FIG. 6 is a flow diagram that summarizes the peak filter management scheme for adaptively controlling a plurality of peak filters to suppress the influence of external vibrations according to one embodiment of the present invention. At the start of each error rejection optimization process 600, the magnitude of the PES is obtained at step 602. The PES is compared to a preset PES threshold (step 604). If the PES does not exceed the PES threshold, the peak filters are disabled (step 606), the current error rejection optimization process ends and the peak filter management scheme proceeds to the start of the next error rejection optimization process (step 610). If the PES exceeds the PES threshold, the next step 612 is to compare the peak filter output with the peak filter input. If the largest peak filter output over the peak filter input ratio does not exceed a preset ratio threshold (step 614), the peak filters are disabled (step 616). If the largest peak filter output over the peak filter input exceeds the preset ratio threshold, the peak filter outputs of the peak filters are selectively added to the plant control signal in step 618.

The remaining portion of the peak filter management scheme is carried out depending on whether the peak filters are variable (step 620). If the peak filters are fixed, the current error rejection optimization process ends (step 610). If the peak filters are variable, the peak frequencies can be adjusted. Step 622 compares the magnitudes of the peak filter outputs of the filters with different peak frequencies. If the output of the peak filter which has the highest resonant frequency is larger than the outputs of the other peak filters (step 624), the peak frequencies of the peak filters are adjusted upward (step 626). If the output of the peak filter which has the lowest resonant frequency is larger than the outputs of the other peak filters (step 628), the peak frequencies of the peak filters are adjusted downward (step 630). This ends the current error rejection optimization process and the next error rejection optimization process can begin (step 610). Instead of the adaptive frequency change method described in steps 622 to 630, an alternative method is to determine the frequency or frequency range of the disturbance using a conventional frequency identification method (step 640). The peak frequencies of the peak filters can be adjusted upward or downward in step 642 based on the identified frequency or frequency range of the disturbance. The above scheme may be implemented in software or firmware, and be stored in a computer-readable storage medium in the supervisor module 420 for execution by a computer processor.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A system to suppress influence of an external disturbance to an actuator, the system comprising:
   a controller providing a controller output as an actuator input to drive an actuator;
   a feedback loop to feed a head signal at an output of the actuator back as an input to the controller to produce an error signal;
   one or more peak filters coupled to the controller and having different peak frequencies, each peak filter having a peak filter input including the error signal each peak filter having a peak filter output; and
   a supervisor module coupled with the peak filters to selectively add or delete the peak filter output of each peak filter to the actuator input to drive the actuator, wherein the supervisor module is configured to delete the peak filter outputs of the peak filters to the actuator input if the error signal does not exceed a preset error signal threshold.

2. The system of claim 1 wherein the peak filters are coupled in parallel to the controller.

3. The system of claim 1 wherein the supervisor module is configured to delete the peak filter outputs of all of the peak filters to the actuator input if the largest peak filter output of the peak filters over the peak filter input does not exceed a preset ratio threshold.

4. The system of claim 1 wherein the supervisor module is configured to selectively add the peak filter outputs of all of the peak filters to the actuator input if the peak filter output of at least one of the peak filters over the peak filter input exceeds a preset ratio threshold.

5. The system of claim 1 wherein the supervisor module is configured to add the peak filter outputs of a subset of the peak filters to the actuator input if the peak filter outputs of the subset over the peak filter input exceed a preset ratio threshold.

6. The system of claim 1 wherein at least one of the peak filters has a variable peak frequency.

7. The system of claim 6 wherein the peak filters have variable peak frequencies.

8. The system of claim 7 comprising a frequency identification module configured to determine a frequency of the external disturbance, wherein the supervisor module is configured to adjust the variable peak frequencies of the peak filters based on the frequency of the external disturbance.

9. The system of claim 7 wherein the supervisor module is configured to compare magnitudes of the peak filter outputs of the peak filters; and (i) to adjust the peak frequencies of the peak filter upward if the magnitude of the peak filter output of the peak filter having the highest peak frequency is larger than the magnitudes of the peak filter outputs of remaining peak filters; and (ii) to adjust the peak frequencies of the peak filters downward if the magnitude of the peak filter output of the peak filter having the lowest peak frequency is larger than the magnitudes of the peak filter outputs of remaining peak filters.

10. A method of suppressing influence of an external disturbance to an actuator, the method comprising:
providing a controller output of a controller as an actuator input to drive an actuator;
feeding a head signal at an output of the actuator back as an input to the controller to produce an error signal;
coupling one or more peak filters to the controller, the peak filters having different peak frequencies, each peak filter having a peak filter input including the error signal, each peak filter having a peak filter output; and
selectively adding or deleting the peak filter output of each peak filter to the actuator input to drive the actuator, wherein selectively adding or deleting a first peak filter output is based on a ratio of one of the peak filter outputs to a peak filter input.

11. The method of claim 10 wherein the peak filters are coupled in parallel to the controller.

12. The method of claim 10 wherein the peak filter outputs of the peak filters to the actuator input are deleted if the error signal does not exceed a preset error signal threshold.

13. The method of claim 10 wherein the peak filter outputs of all of the peak filters to the actuator input are deleted if the largest peak filter output of the peak filters over the peak filter input does not exceed a preset ratio threshold.

14. The method of claim 10 wherein the peak filter outputs of all of the peak filters are selectively added to the actuator input if the peak filter output of at least one of the peak filters over the peak filter input exceeds a preset ratio threshold.

15. The method of claim 10 wherein the peak filter outputs of a subset of the peak filters are added to the actuator input if the peak filter outputs of the subset over the peak filter input exceeds a preset ratio threshold.

16. The method of claim 10 wherein at least one of the peak filters has a variable peak frequency.

17. The method of claim 16 wherein the peak filters have variable peak frequencies.

18. The method of claim 17 further comprising:
determining a frequency of the external disturbance; and
adjusting the variable peak frequencies of the peak filters based on the frequency of the external disturbance.

19. The method of claim 17 further comprising:
comparing magnitudes of the peak filter outputs of the peak filters and;
adjusting the peak frequencies of the peak filter upward if the magnitude of the peak filter output of the peak filter having the highest peak frequency is larger than the magnitudes of the peak filter outputs of remaining peak filters; and
adjusting the peak frequencies of the peak filters downward if the magnitude of the peak filter output of the peak filter having the lowest peak frequency is larger than the magnitudes of the peak filter outputs of remaining peak filters.

20. The method of claim 10 wherein ratio of one of the peak filter outputs to a peak filter input includes the first peak filter output.

21. A system to suppress influence of an external disturbance to an actuator, the system comprising:
a controller providing a controller output as an actuator input to drive an actuator;
a feedback loop to feed a head signal at an output of the actuator back as an input to the controller to produce an error signal;
a plurality of peak filters coupled to the controller and having different peak frequencies, each peak filter having a peak filter input including the error signal, each peak filter having a peak filter output; and
a supervisor module coupled with the peak filters, the supervisor module including a program stored in a computer-readable storage medium, the program having code for selectively adding or deleting the peak filter output of each peak filter to the actuator input to drive the actuator,
wherein the peak filters have variable peak frequencies, and wherein the program comprises:
code for comparing magnitudes of the peak filter outputs of the peak filters and;
code for adjusting the peak frequencies of the peak filter upward if the magnitude of the peak filter output of the peak filter having the highest peak frequency is larger than the magnitudes of the peak filter outputs of remaining peak filters; and
code for adjusting the peak frequencies of the peak filters downward if the magnitude of the peak filter output of the peak filter having the lowest peak frequency is larger than the magnitudes of the peak filter outputs of remaining peak filters.

22. The system of claim 21 wherein the program comprises code for deleting the peak filter outputs of the peak filters to the actuator input if the error signal does not exceed a preset error signal threshold.

23. The system of claim 21 wherein the program comprises code for deleting the peak filter outputs of the peak filters to the actuator input if the largest peak filter output of the peak filters over the peak filter input does not exceed a preset ratio threshold.

24. The system of claim 21 wherein the program comprises code for selectively adding the peak filter outputs of the peak filters to the actuator input if the peak filter output of at least one of the peak filters over the peak filter input exceeds a preset ratio threshold.

25. The system of claim 24 wherein the program comprises code for adding the peak filter outputs of one or more of the peak filters to the actuator input if the peak filter outputs of the one or more peak filters over the peak filter input exceed the preset ratio threshold.

26. The system of claim 21 wherein the peak filters have variable peak frequencies, and wherein the program comprises:
   code for determining a frequency of the external disturbance; and
   code for adjusting the variable peak frequencies of the peak filters based on the frequency of the external disturbance.

* * * * *